United States Patent [19]

Vissers et al.

[11] 4,401,022
[45] Aug. 30, 1983

[54] DEVICE FOR BALING AGRICULTURAL CROP

[75] Inventors: Hermanus H. Vissers; Gijsbert J. Mijnders, both of Nieuw-Vennep, Netherlands

[73] Assignee: Multinorm, B.V., Nieuw-Vennep, Netherlands

[21] Appl. No.: 274,064

[22] Filed: Jun. 16, 1981

Related U.S. Application Data

[63] Continuation of Ser. No. 85,706, Oct. 17, 1979, abandoned.

[30] Foreign Application Priority Data

Nov. 3, 1978 [NL] Netherlands ............... 7810948

[51] Int. Cl.³ .................. B30B 15/30; B30B 15/32
[52] U.S. Cl. ............................ 100/100; 56/344; 100/218; 100/250
[58] Field of Search ............ 100/100, 250, 215, 218, 100/188 R, 189, 142; 56/341, 343, 344

[56] References Cited
U.S. PATENT DOCUMENTS 2,552,888  5/1951  Druetta .................... 100/100 X
4,034,543  7/1977  Voth ........................ 100/50
4,126,089  11/1978 Oosterling ................ 100/250
4,151,793  5/1979  Oosterling ................ 100/3 X
4,184,312  1/1980  Oosterling ................ 56/341
4,184,426  1/1980  Oosterling ................ 100/250

Primary Examiner—Billy J. Wilhite
Attorney, Agent, or Firm—Diller, Ramik & Wight

[57] ABSTRACT

A device for baling agricultural crop comprising a compression chamber, a sidewall of which has an inlet port, a driven pressing member adapted to reciprocate along said port, an auxiliary space communicating with said inlet port for temporarily storing the crop to be compressed and a member periodically closing said inlet port and being rotatable about an axis transverse of the direction of movement of the pressing member in order to advance the crop out of the auxiliary space via the inlet port into the compression chamber, wherein the boundary of the auxiliary space near the transverse axis is formed by one or more elements having a circular circumference coaxial with the transverse axis, whereby it is avoided that crop is jammed between the rotatable member and the neighbouring boundary of the auxiliary space.

11 Claims, 3 Drawing Figures

DEVICE FOR BALING AGRICULTURAL CROP

This is a continuation, of application Ser. No. 85,706 filed Oct. 17, 1979, now abandoned.

The invention relates to a device for baling agricultural crop comprising a compression chamber, a sidewall of which has an inlet port, a driven pressing member adapted to reciprocate along said port, an auxiliary space communicating with said inlet port for temporarily storing the crop to be compressed and a member periodically closing said inlet port and being rotatable about an axis transverse of the direction of movement of the pressing member in order to advance the crop out of the auxiliary space via the inlet port into the compression chamber.

The invention has for its object to improve the boundaries of the auxiliary space in a manner such that the risk of crop being jammed between the rotatable member and said boundaries is avoided.

The device is distinguished in that the boundary of the auxiliary space near the transverse axis is formed by one or more elements having a circular circumference coaxial with the transverse axis.

Owing to this circular, coaxial circumference it is not possible for crop to be jammed between the rotatable member and the neighbouring boundary of the auxiliary space, and, on the contrary, the crop is carried along by the rotatable member without disturbance from the auxiliary space into the compression chamber. Any foreign ojects in the crop, for example, wood or steel pieces, will not be jammed so that damage thereby is avoided.

Preferably each boundary element is adapted to rotate together with the blocking member about the transverse axis. Thus, since the circumference is coaxial with the axis, the boundary of the auxiliary space does not change. It is thus possible to construct the blocking member and the boundary element as a unit, which provides a particularly strong construction.

In a preferred embodiment the blocking member consists of parallel, rod-shaped elements, each of which is rotatable about the transverse axis together with the associated, cylindrical boundary element of the same thickness as the rod-shaped element.

When the device is provided with one or more advancing members movable along an endless path at the inlet of the auxiliary space, the path of movement is, in accordance with the invention, such that the advancing members pass each time in between the boundary elements, that is to say, the advancing members get each time inside the circular contour line of the boundary elements coaxial with the transverse axis. Owing to this step the advancing members set themselves free from the crop, which is retained by the boundary elements, so that an effective advancement of the crop into the auxiliary space is obtained. Preferably, the advancing member is formed by a plurality of parallel, substantially elongated plates, the advancing rim of which is bent back on the rear side with respect to the direction of movement to an extent such that a free-running rim is formed. In this way the advancing plates disengage the crop more readily.

The invention furthermore relates to a device of the kind set forth in the preamble comprising a tiltable end portion of the compression chamber on the side remote from the inlet port, by which portion an outlet port is formed.

With this type of baler the invention has for its object to facilitate the expulsion of the compressed bales at the outlet port. For this purpose the invention suggests to provide thrusting means near the outlet port, which becomes operative when the tiltable end portion of the compression chamber is opened.

Preferably the thrusting movement of the expelling means is derived from the movement of the tiltable wall portion of the compression chamber so that additional driving means are not required.

In a particularly simple embodiment the wall part of the tiltable end portion of the compression chamber adjacent the hinge is prolonged as far as beyond the hinge, thus forming an expelling means. When the end portion is tilted away, the projecting prolonged part will enter the compression chamber and thus push the compressed bale away.

Finally the invention tends to improve the ejection of the bale formed in manner such that the risk of rupture of the string arranged around the bale, (see U.S. Pat. No. 4,151,793, for example) is avoided. This plays an important part in the case of high-pressure balers producing bales of 500 kgs or more, since the compression chamber is situated comparatively high above the ground. The drop of the heavy bale over a comparatively large distance may bring about rupture of one or more binding wires.

In order to solve this problem the invention proposes to arrange stop means at a distance below the lower edge of the outlet port. During the ejection the bale is thus caused to rotate before touching the ground. Part of the energy of the fall is annulled by the rotation, particularly when the bale strikes a longitudinal edge.

The invention will be described more fully with reference to an embodiment.

Figure 1:
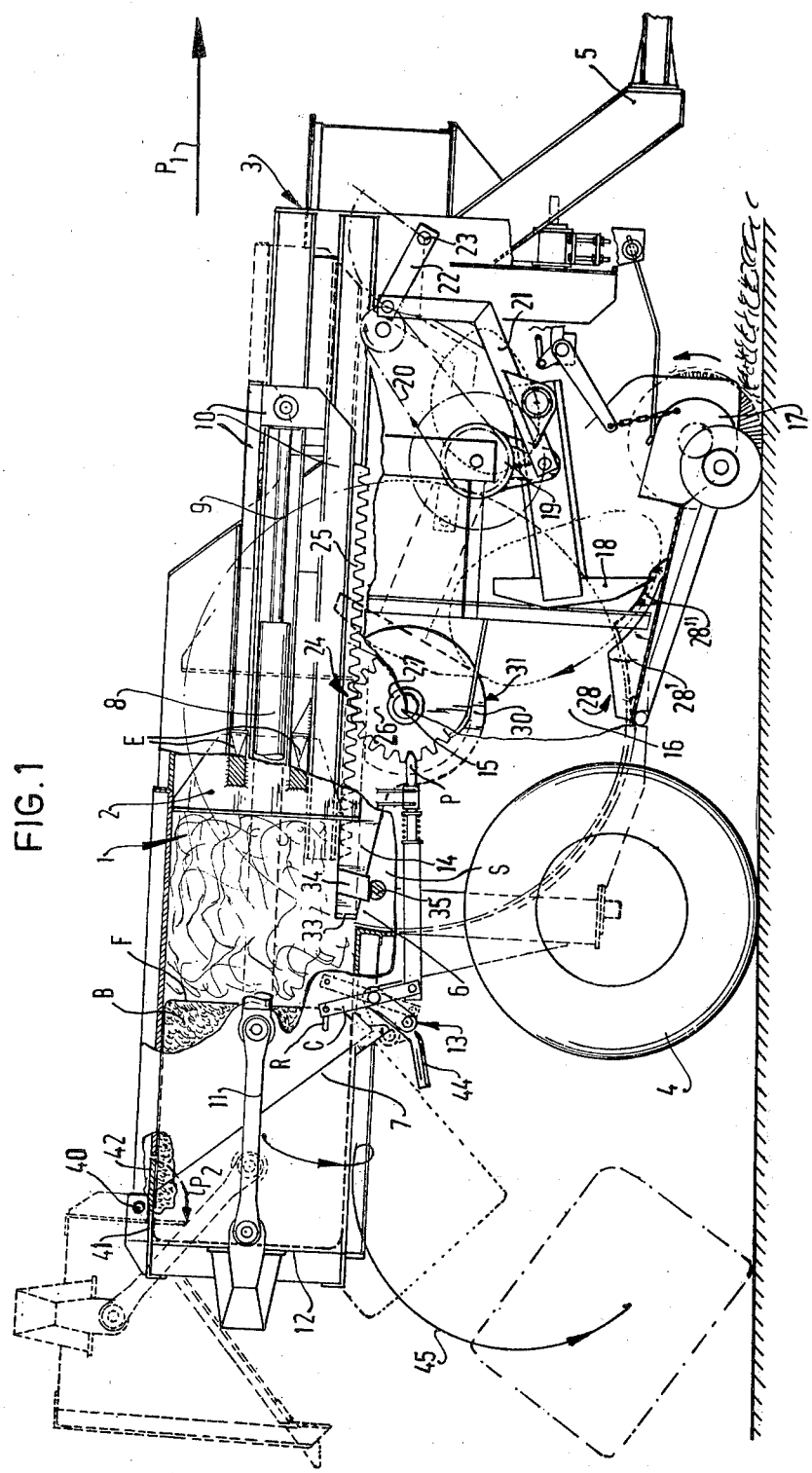
FIG. 1 is a longitudinal sectional view of the device in accordance with the invention.

The baler shown in the FIGS. comprises mainly a lying compression chamber 1, in which a driven, reciprocatory ram 2 is arranged. The compression chamber 1 is carried by a frame 3 having a ground wheel 4 and a drawbar 5, by which the device can be hitched to a tractor or the like. The device is moved by the tractor in the direction indicated by the arrow P1 across the field.

The ram 2 is movable along an inlet port 6 up to a delivery port 7 for which purpose the ram is equipped with two driving mechanisms, arranged each on one side of and outside the compression chamber 1. Each driving mechanism is formed by a hydraulic ram 8, the piston rod 9 of which is connected at its free end with a pressure body 10 of the ram 2. The pressure body 10 is formed by two hollow beams extending each on one side of the ram 8 and being each fastened at the ram 2 to ears E, E connected herewith.

The ears E, E of the ram 2 project through slots in the sidewall of the compression chamber 1.

The end of the hydraulic ram 8 remote from the piston rod 9 is connected through a coupling rod 11 with a pivotal point of the upwardly pivotable rear wall 12 of the compression chamber 1.

The rear wall 12 can be locked by means of lock bolts 13 in the closed or pressing state.

The inlet port 6 can be closed by a closing member or flap portion 14. The flap portion 14 can turn through 360° about a shaft 15, which extends transversely of the direction of movement of the ram 2 and parallel to the plane going through the inlet port 6, the shaft 15 being located outside the compression chamber 1 as well as outside an auxiliary space 16 arranged beneath the former.

The auxiliary space 16 joins the inlet port 6 and the entry of the auxiliary space 16 indicated on the right-hand side in FIG. 1 is directed tangentially to the substantially circle-segment-shaped form of the auxiliary space.

The input is provided with a pick-up set 17 for picking up the crop from the ground and passing it into the auxiliary space 16. Advancing members 18 push the crop further into the auxiliary space 16. The advancing members 18 are rotatably mounted on a rotatable disc or crank 19, which is continuously driven by any suitable driving means, in this case a rope 20, whilst the advancing members 18 are fastened to arms 21, which are pivotable about a stub shaft 23 via rocker arms 22. When the crank 19 turns, the advancing member 18 will trace an elliptic path so that the lower ends of the advancing members 18 describe the closed path shown in the FIG., the lower ends initially moving horizontally and then obliquely to the right upwards in the auxiliary space 16.

The rotary movement of the flap portion 14 closing each time the inlet port 6 of the compression chamber 1 is obtained from a transmission mechanism 24, which utilises the reciprocatory movement of the ram 2. The transmission mechanism 24 provided on each side of the compression chamber 1 comprises a toothed rack 25 fixedly mounted on the lower hollow beam 10 of the pressing body and co-operating with a pinion 26, which is connected with the shaft 15 through an overrunning clutch 27. The overrunning clutch 27 is arranged so that during the return stroke of the ram 2 a fixed coupling is established between the pinion 26 and the shaft 15, whereas during the forward stroke of the ram 2 the pinion 26 rotates freely.

It will be appreciated that the "home" position of the ram 2 is at the face F of the finished bale B, in which position the piston rod 9 of the hydraulic device is retracted. Starting from this "home" position, when an amount of crop has accumulated in the space 16, the hydraulic device 8, 9 is actuated to extend the piston rod 9. At this time, the locking device 13 as well as the actuating crank C are in the dashed line positions thereof as indicated in FIG. 1 and, consequently not only is the rear wall 12 locked but also the pawl P is retracted from engagement with the pinion 26. Thus, as the rack 25 and thus the ram 2 moves to the right, the clockwise rotation of the flap portion 14 is effected due to the transmission effected by the clutch 27. When the ram is fully retracted, the flap portion 14 will have returned to its original position shown in full lines. The piston rod 9 is then retracted to effect the compression stroke of the ram and return it to "home" position, the clutch 27 overruning in the process. When a number of these cycles have been completed, building up the requisite density and size of the bale B, the crank C is actuated to move the lock 13 and the pawl P to their full line positions as shown in FIG. 1. Since the pinion 26 is now locked against rotation, the rack 25 is likewise locked and hydraulic pressure exerted against the piston rod 9 will now shift the cylinder 8 to the left so that, through the linkage 11, the end wall 12 is swung open to its dashed line position, discharging the finished bale B as shown. Operation of the lock 13 and pawl P may be effected through the medium of a rod R connected to the upper end of the crank C.

The proportions of the toothed rack 25 and of the pinion 26 are furthermore such that with a full return stroke of the ram 2 the flap portion 14 turns simultaneously at least through 360° in clockwise direction. According to one feature of the invention the boundary of the auxiliary space 16 near the transverse shaft 15 is formed by elements 30, the outer circumference 31 of which is circular and coaxial with the transverse shaft 15.

Figure 2:
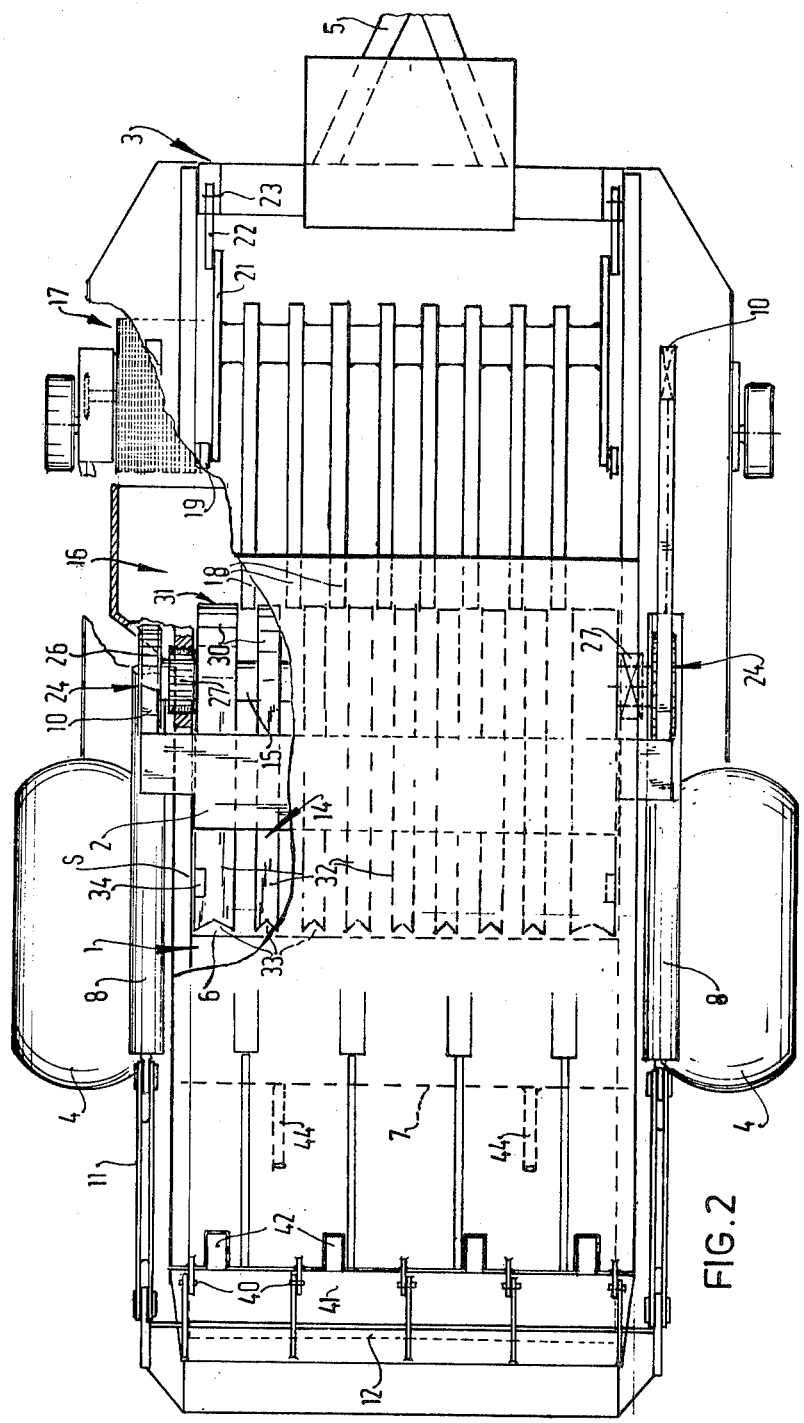
FIG. 2 is a plan view of the device of FIG. 1.
Figure 3:
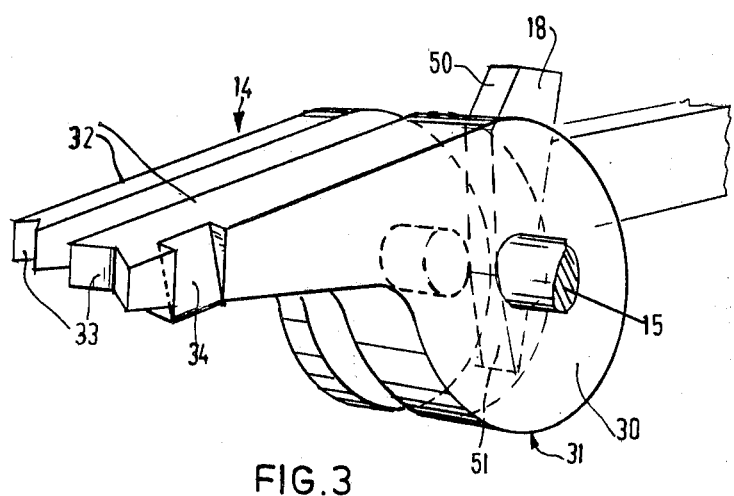
FIG. 3 is a perspective view of the blocking member, the boundary element and the advancing member in a preferred embodiment used in the device of the preceding FIGS.

FIGS. 2 and 3 show that the closing member 14 is formed by elongated, rod-shaped elements 32, which may be solid or hollow. The elements 32 are spaced apart by a given distance and thus constitute a grid-shaped closing member 14. In FIG. 3 it is clearly shown that the elements 30 and 32 are integral with one another so that a rugged structure is obtained. The free ends of the elements 32 are notched at 33 in V-shaped fashion, which ensures an undisturbed transport of the crop from the auxiliary space 16 into the compression chamber 1 by means of the elements 32.

Referring to FIG. 3, the foremost element 32 is at the same time the outermost element of the closing member 14, said outermost element having an inclined stop-guide surface 34, which co-operates with a stop 35 in the sidewalls of the auxiliary space 16. At this spring-loaded stop 35 the closing member can be guarded against backward rotation in the closing state.

It will be obvious that during the turn in clockwise direction the spring-loaded stop 35 is urged away and snaps into the locking position beneath the closing member 14.

The path of the advancing members 18 and that of the rotatable elements 32 cross one another, as is illustrated in FIG. 1, the movement of the advancing members being such that the crop is each time lifted from the bottom of the auxiliary space 16 so that during the rotation of the member 14 no crop can get in between the ends 33 of the grating 14 and the bottom of the auxiliary space 16, as a result of which jamming or jolting operation is avoided.

A further improvement is obtained by arranging on the bottom of the space 16 a grid-shaped threshold 28, which fills out the portion of the auxiliary space 16 which is located outside the path of the rotatable grating 14 and the advancing forks 18. The grid-shaped threshold comprises alternating plates 28' and 28", the shapes of which are different so that the rotatable elements 32 move between the plates 28' and over the plates 28", whereas the advancing members 18 move between the plates 28" and over the plates 28'. This configuration of the threshold 28 materially reduces the risk of jamming of crop between the stationary and rotatable parts and enhances the transit capacity in the auxiliary space.

From FIG. 1 it will furthermore appear that the path of the advancing members 18 indicated by broken lines is such that the lower sides of the advancing members 18 also pass through the space formed between the elements 30 (see FIG. 3), which means that the advancing members are located inside the circular contour lines of the elements 30.

In the embodiment shown the advancing members 18 have the shape of hammers, the operative parts consisting of a plurality of standing and parallel, mainly elongated plates, the advancing rim 50 of which is directed towards the auxiliary space 16. On the bottom side 51 the advancing rim 50 is tapered back so that with respect to the direction of movement the lower side of the advancing rim 50 moves freely so that the plate 18 can readily withdraw from the crop.

The tiltable end portion of the compression chamber 1 is formed by the head walls, a bottomwall, triangular sidewall portions and an upper wall of the compression chamber 1. The top wall is provided with a hinge 40, about which the end portion of the compression chamber 1 can turn upwards. The top wall 41 of the tiltable portion is prolonged beyond the hinge 40 at 42. This prolongation may cover part of or the whole width of the compression chamber 1. FIG. 2 shows four prolonged tags 42. When the end portion is tilted upwards about the hinge 40, the tags 42 will turn in the direction of the arrow P2 and project into the space of the compression chamber 1. It will be obvious that the tags 42 will push a bale of crop.

At a given distance below the lower rim 43 of the delivery port 7 stop means 44 are provided in the form of two kinked, tubular elements extending as far as into the path of fall of the bale formed.

When the bale drops down, its lower side will strike the stops 44 so that the bale is caused to rotate, which is illustrated by the curve 45.

What is claimed is:

1. A device for baling agricultural crop comprising a compression chamber having an inlet port in a sidewall, a driven pressing member adapted to reciprocate along said port, an auxiliary chamber having a crop inlet port and communicating with said inlet port for temporarily storing the crop to be compressed and a closing member periodically closing the inlet port and being rotatable about an axis transverse of the direction of movement of the pressing member for advancing the crop from the auxiliary chamber via the inlet port into the compression chamber wherein said closing member comprises a plurality of parallel elements each having a circular portion and a flap portion extending tangentially from said circular portion, said circular portions having outer circumference surfaces coaxial with and spaced along said transverse axis.

2. A device as claimed in claim 1 wherein said flap portions are rod shaped.

3. A device as claimed in claim 2 wherein the ends of said flap portions remote from said transverse axis are notched in V-shaped configuration.

4. A device as claimed in claim 4 characterized in that the wall of the auxiliary space remote from the transverse axis is provided with plates of alternatively different shapes so that on the one hand they extend into the path of the rotatable elements and on the other hand into the path of the advancing members.

5. A device as claimed in any one of claims 1, 2 or 3 including a plurality of advancing members movable along a closed path and arranged near said crop inlet port of said auxiliary chamber such that said closed path of said advancing members passes between said elements of said closing member.

6. A device as claimed in claim 5 wherein said advancing members comprise elongate elements having tapered trailing surfaces whereby said elements are freely withdrawn from the crop being collected in said auxiliary chamber.

7. A device as claimed in claim 6 characterized in that the wall of the auxiliary chamber remote from the transverse axis is provided with plates of alternatively different shapes so that on the one hand they extend into the path of the flap portions and on the other hand into the path of the advancing members.

8. A device as claimed in claim 5 characterized in that the wall of the auxiliary chamber remote from the transverse axis is provided with plates of alternatively different shapes so that on the one hand they extend into the path of the flap portions and on the other hand into the path of the advancing members.

9. A device for baling an agricultural crop comprising a mobile frame defining a generally horizontal compression chamber having end, top, bottom and side walls into which the crop is to be compressed to form a bale and having an inlet port spaced from said end wall, a driven pressing member reciprocable within said compression chamber toward and away from said end wall traversing said inlet port, a tiltable portion of said compression chamber including said end wall and adjacent portions of said top, bottom, and side walls pivotable about an axis above said top wall and transverse the reciprocable movement of said pressing member to provide a delivery port remote from said inlet port, means forming part of said tiltable portion and movable therewith for expelling the bale through said delivery port as said tiltable portion is pivoted, and drive means for providing said tiltable portion.

10. A device as claimed in claim 9 wherein said means for expelling comprises a part of the top wall portion of said tiltable portion extending from said end wall beyond said axis.

11. A device as claimed in claim 9 or 10 in that stop means are provided at a distance below the lower edge of the delivery port of the compression chamber.

* * * * *